United States Patent [19]

Dri et al.

[11] 4,091,751

[45] May 30, 1978

[54] PLANTING MACHINE

[76] Inventors: Alfredo Félix Dri; Jorge César Miranda, both of Paso de los Libres, Montevideo 893, Prov. Corrientes, Ark.

[21] Appl. No.: 777,734

[22] Filed: Mar. 15, 1977

[30] Foreign Application Priority Data

Mar. 17, 1976 Argentina .............................. 262598

[51] Int. Cl.$^2$ ........................ A01C 11/00; A01C 23/02
[52] U.S. Cl. ......................................... 111/2; 111/52; 111/6
[58] Field of Search ........................ 111/2, 3, 6, 18, 23, 111/24, 25, 52, 70, 71, 72, 74, 77, 78, 87

[56] References Cited

U.S. PATENT DOCUMENTS

| 215,410 | 5/1879 | Teamer | 111/3 X |
|---|---|---|---|
| 371,426 | 10/1887 | Clow | 111/3 |
| 913,466 | 2/1909 | Brown | 111/23 |
| 2,506,430 | 5/1950 | Melvin, Jr. | 111/2 X |
| 2,543,888 | 3/1951 | Bunch | 111/74 X |
| 3,175,524 | 3/1965 | Kappelmann | 111/3 X |
| 3,294,046 | 12/1966 | Boots | 111/3 |
| 3,702,664 | 11/1972 | Clement | 111/2 X |

FOREIGN PATENT DOCUMENTS

| 854,879 | 4/1940 | France | 111/3 |
|---|---|---|---|
| 1,132,106 | 3/1957 | France | 111/3 |
| 362,312 | 10/1922 | Germany | 111/3 |

*Primary Examiner*—E.H. Eickholt
*Attorney, Agent, or Firm*—Ladas, Parry, Von Gehr, Goldsmith & Deschamps

[57] ABSTRACT

An automatic planting machine for planting plants particularly small and/or young trees, specially designed for forestation and/or reforestation and the like. The machine has, in each of its main wheels, at least one planting tube radially movable and capable of projecting through an aperture in the rim of the wheel coincident with the moment at which a plant is set in the furrow opened by the machine. To open the furrow in the soil, a furrow opening blade is provided in front of each main wheel. Behind each main wheel a pair of auxiliary rear wheels are provided which are capable of tamping the soil at the sides of the plant set in the furrow, and each of said auxiliary rear wheels may be sloped. Means are provided which are capable of feeding plants, one at a time, to each planting tube, the operation of said feeding means and the movement of each planting tube being timed with the rotation of the pertinent main wheel. The machine may be provided with means (e.g. hydraulic) for removing the main wheels from contacting the ground for transportation. A water reservoir and water feeding means may be provided for feeding water to the planted plants. Optionally, conveyor means for forwarding plant containing cases, may also be provided.

11 Claims, 14 Drawing Figures

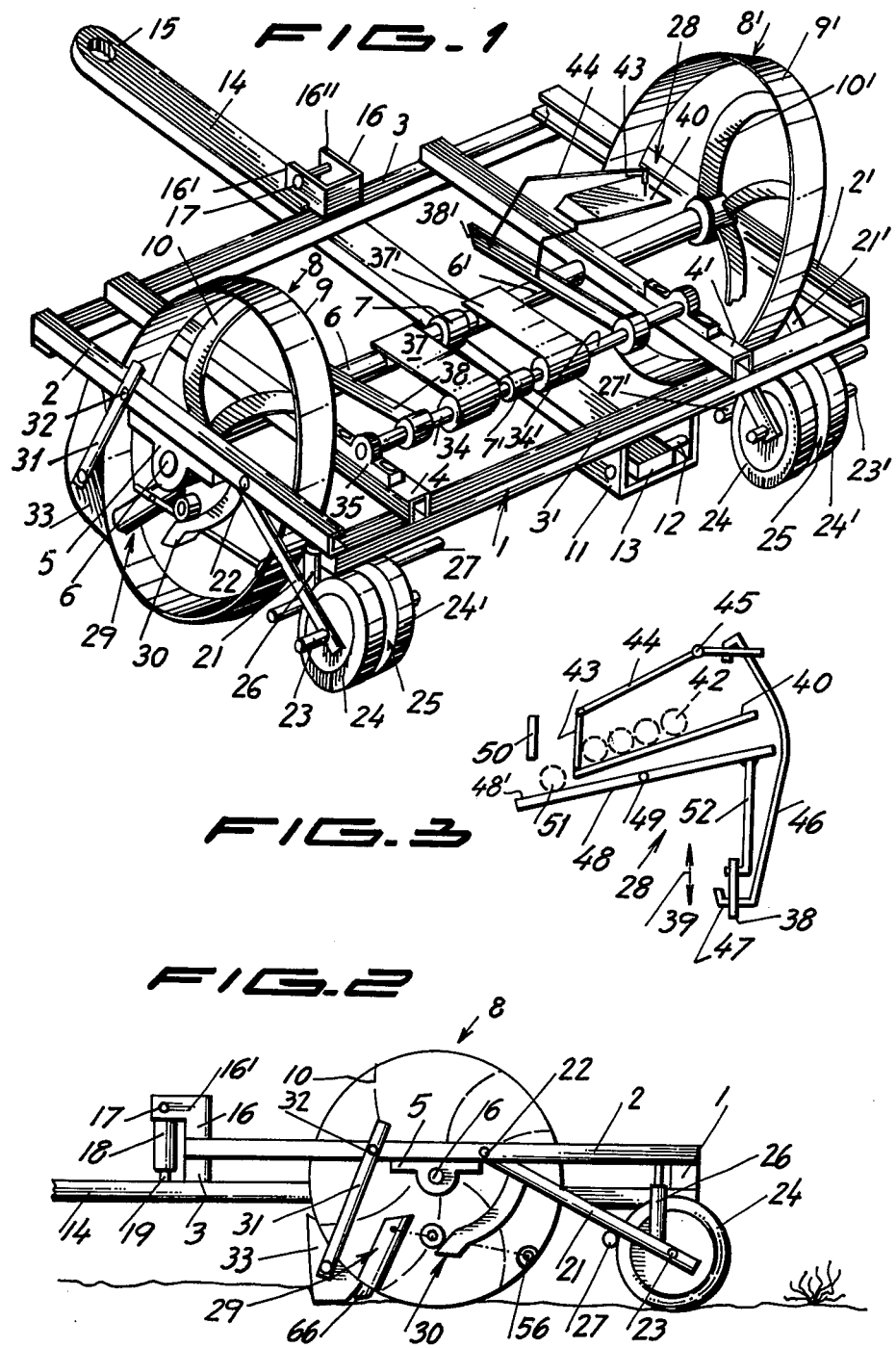

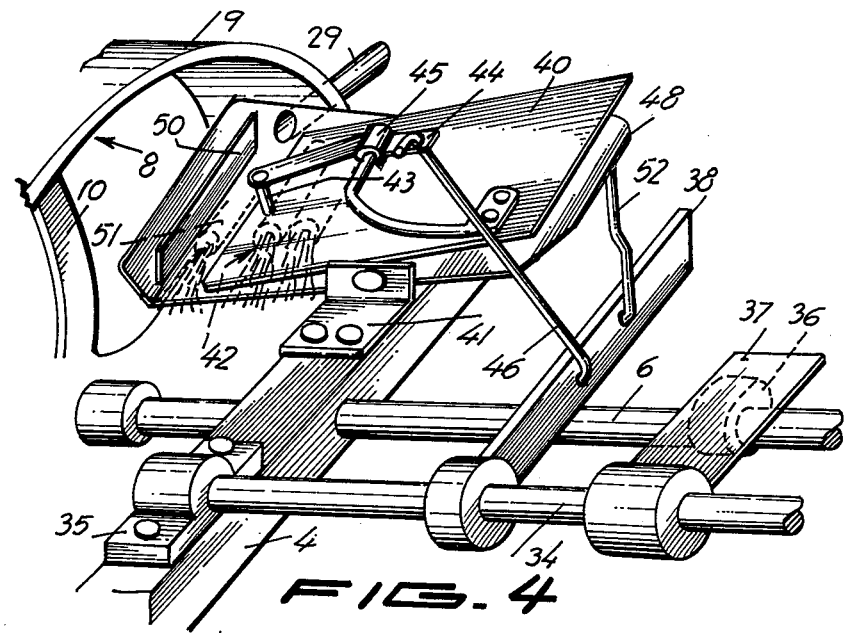
FIG. 4
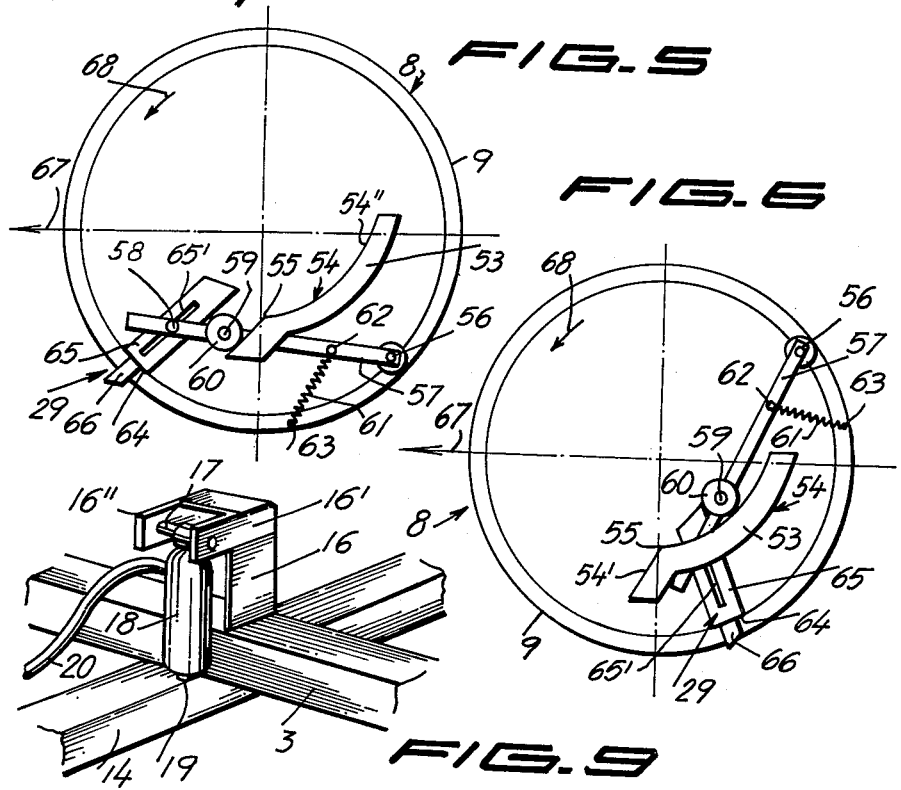
FIG. 5
FIG. 6
FIG. 9

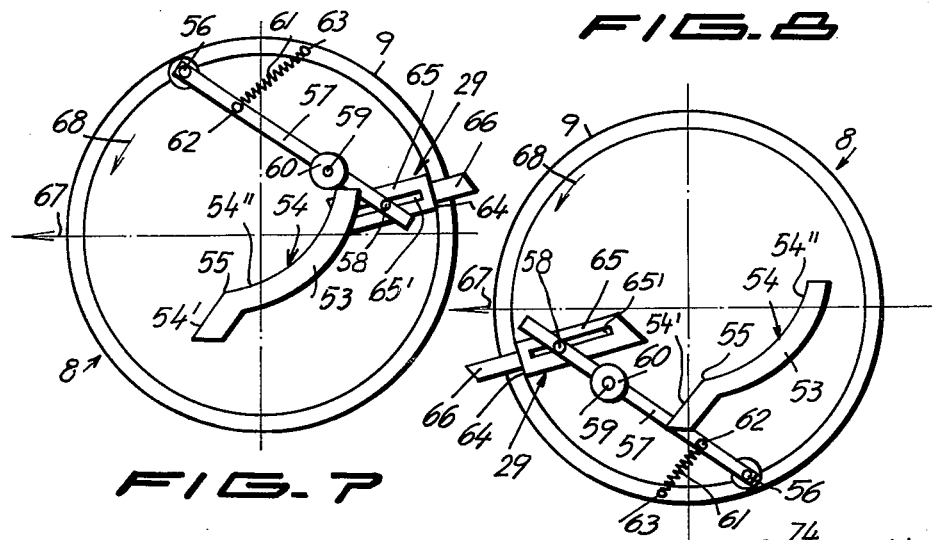
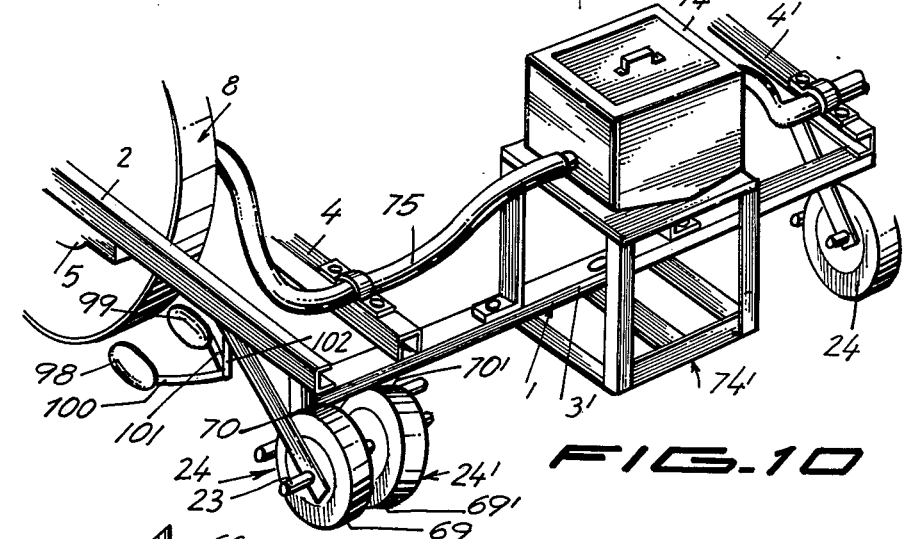
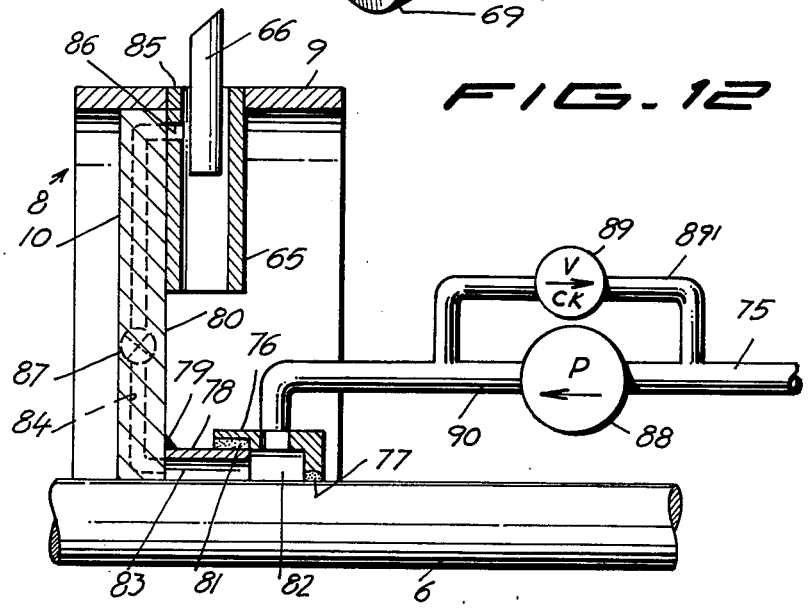

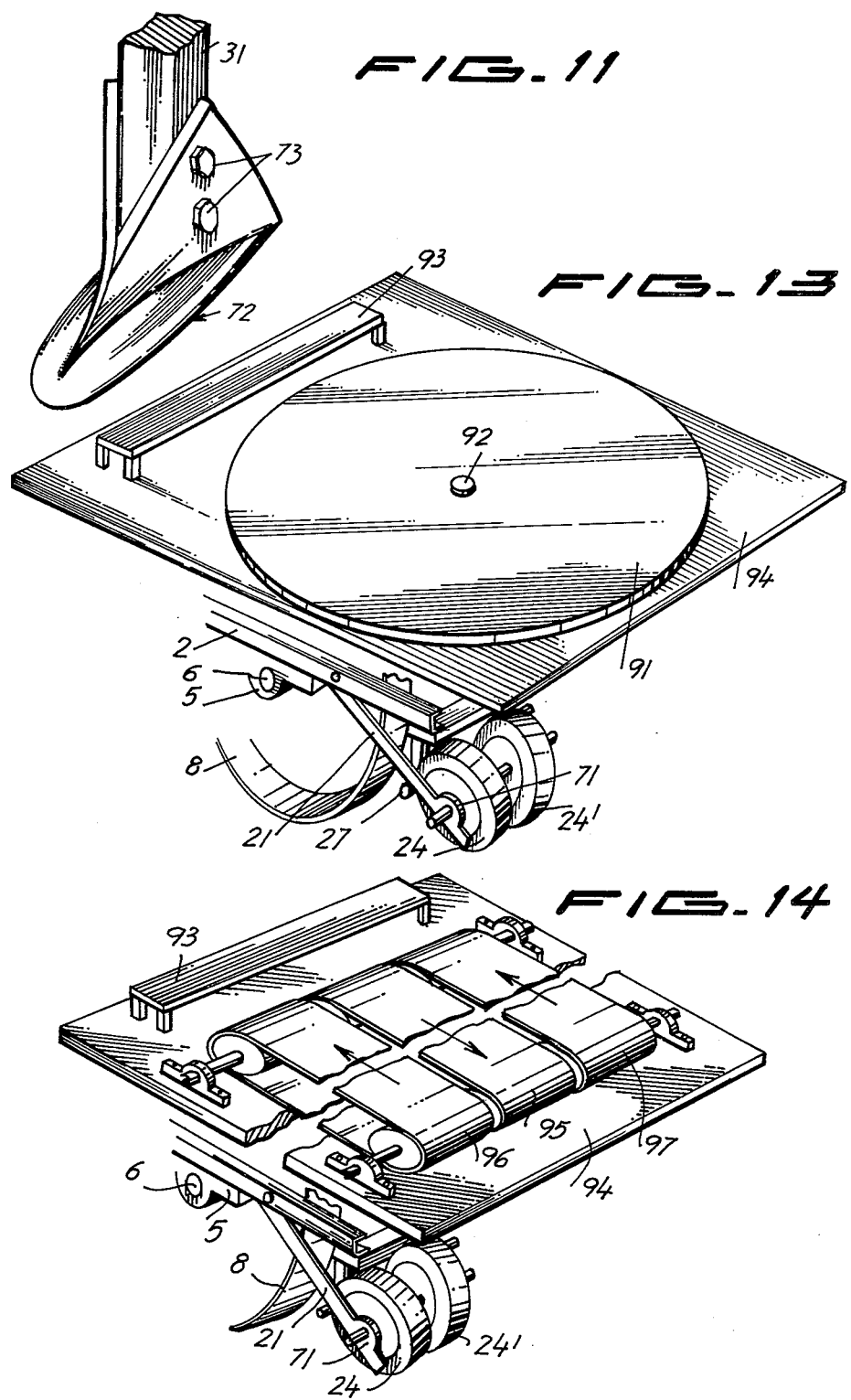

PLANTING MACHINE

BACKGROUND OF THE INVENTION

1. Field of the Invention

This invention relates to an automatic planting machine. More particularly, this invention relates to an automatic planting machine which allows to plant regularly spaced apart plants in rows.

2. Description of the Prior Art

Machines known in the art only open a furrow and an attendant, on the machine, inserts successively the young plants into the ground within the furrow opened by the machine. Afterwards it becomes necessary through another device, to close the furrow, and add earth around each plant, to maintain it in proper position. The entire operation is tedious, tiresome, and time consuming. As to the uniformity of planting it is far from being acceptable, since it depends in a high degree on the skillfulness of the attendant as far as distance and timing is concerned, and also on the speed with which he is able to withdraw the plants from the cases containing them. A certain percentage of the plants may become damaged during their handling, specially due to fatigue of the attendant and/or sometimes due to a certain lack of enough sense of responsability.

SUMMARY OF THE INVENTION

The invention provides an automatic planting machine which allows to carry out more efficiently the uniform planting of small and/or young plants, and a uniform and correct spacing of adjacent plants in the same row is automatically obtained, independently from the judgement of distance and timing of the machine attendant.

The automatic planting machine comprises a chassis, a main wheel at each side of the chassis and rigidly mounted on corresponding independent axles rotatively supported by said chassis, the rim of each main wheel having at least one through aperture; a planting tube slidably mounted in each of said through apertures and timed with the rotation of the corresponding main wheel, and means capable of feeding plants, one at a time, toward the input end of each planting tube timed with the rotation of the corresponding main wheel.

It is an object of this invention to provide a machine of the type mentioned which allows to carry out a planting operation with a minimum degree of damaging, or even without damaging at all, the plants which are handled.

Another object of this invention is to provide a planting machine which reduces to a minimum the fatigue of the machine attendant.

Another object is to provide a planting machine which is capable of opening a furrow, setting the plants therein at the required distance one from the others, and closing again the furrow.

Another object is to provide a planting machine operable by unskilled attendants. Another object is to provide a planting machine which is capable of feeding a metered quantity of water to the ground around every plant which has been set into a furrow.

Still a further object is to provide a machine which has conveyor means for carrying cases, each containing a certain number of plants, towards the attendant's post and of carrying the empty cases away therefrom.

Another object is to provide a machine which has improved means for tamping the soil of the closed furrow.

BRIEF DESCRIPTION OF THE DRAWINGS

Further features and details of the present invention will become more apparent during the course of the following description, wherein reference is made to the accompanying drawings, which facilitate the explanation of the present invention and wherein a number of embodiments are also shown by way of example. More particularly:

FIG. 1 is a general schematic view of the planting machine according to the invention;

FIG. 2 is a schematic side elevation of the machine;

FIG. 3 is a schematic showing to facilitate the explanation of the operation of the plant feeding mechanism;

FIG. 4 is a schematic view of the structure of the mechanism shown in FIG. 3;

FIGS. 5, 6, 7 and 8 are diagrams illustrating four positions of the radial movement of the planting tube in response to the rotation of the corresponding main wheel;

FIG. 9 is a schematic showing of the arrangement of an hydraulic lifting jack mounted between the chassis of the machine and the drawbar which allows the hitching of the chassis to the towing tractor;

FIG. 10 is a schematic view of the rear of the planting machine, showing the arrangement of the sloped auxiliary rear wheels, a water reservoir mounted on the rear end of the chassis, and a pair of soil stowing scoops mounted behind the pertinent main wheel;

FIG. 11 shows an alternative structure of a furrow opening blade hereinafter called "subsoiling blade".

FIG. 12 shows the water feeding means and water pump arrangement;

FIG. 13 is a schematic view of a rotatable platform for conveying cases, containing the plants to be planted, toward the attendant's post; and FIG. 14 is a schematic view of another conveyor arrangement comprising three conveyor belts, the upper run of the central one being capable of moving away from the attendant's post and the upper run of the other two, arranged one at each side of the central one, being capable of moving toward the attendant's post.

DESCRIPTION OF THE PREFERRED EMBODIMENTS

The automatic planting machine of this invention, shown on FIG. 1, comprises a chassis indicated in general by the reference number 1, said chassis having two longitudinal lateral beams 2 and 2', and two transversal beams 3 and 3', and having also two longitudinal reinforcing beams 4 and 4' which are also used for mounting the cam system members which will be described later on.

On the longitudinal lateral beams 2 and 2' corresponding supporting bearings 5 are mounted for axles 6 and 6' and the facing end portions thereof are located in a sleeve 7, so that each axle may rotate independently. Said sleeve 7 is only an example of a simple supporting arrangement for the axles 2, 2', since it is equally possible to use other means, for example, one of the axles may be telescopically fit into the other.

Between each longitudinal lateral beam 2 or 2' and the corresponding longitudinal reinforcing beam 4 or 4' a corresponding main wheel 8 or 8' is mounted on the pertinent axle 6 or 6'. Each wheel comprises a rim 9 or 9' and corresponding spokes 10 and 10'. Instead of having spokes, the wheels can obviously have a solid central disc. This may be preferable for some embodiments of the machine when means are provided for feeding water to the zone where the plant is put into the furrow, as will be explained later on.

On the lower central portion of the rear transversal beam 3' a bracket 11 is mounted of substantially U shape and having a shaft 12 on which the rear end 13 of a drawbar 14 is pivoted, the forward end 15 of said drawbar 14 being designed to be connected to a rear hitching device of a towing tractor (not shown).

As is partially shown in FIG. 1 and with more details in FIG. 9, a bracket 16 is mounted on the front transversal beam 3. Bracket 16 has two forwardly directed branches 16' and 16" supporting a transverse pin 17 which pivotally supports the end of the cylinder 18 of a lifting jack, the piston rod 19 of which is connected to the drawbar 14. A hydraulic fluid conduit 20 is connected to the cylinder 18, its other end (not shown) being connected to a manually controllable valve provided at the post of the tractor driver. When the driver operates said valve, hydraulic fluid (from a source provided at the tractor) is fed into the cylinder 18 expanding the jack to increase the distance between the front portion of the chassis and the drawbar, to thereby remove the main wheels 8, 8' from ground. When the operator allows the hydraulic fluid to drain from the cylinder (through the same control valve), the distance between said front portion of the chassis and the drawbar decreases until these elements are again in the relative positions shown on FIG. 2, to thereby allow the main wheels 8, 8' to contact ground, and set the apparatus into planting position.

Referring again to FIG. 1, it can be seen that on each longitudinal lateral beam 2 and 2' and on each longitudinal reinforcing beam 4 and 4' corresponding arms 21 and 21' are mounted. One of the ends of each arm 21 and 21' is pivoted by pivot 22 to mount the chassis, and at the other end each pair of arms 21 and 21' supports a corresponding shaft 23 and 23'. Each shaft 23 and 23' has mounted thereon a pair of rear auxiliary wheels 24 and 24' which are spaced apart as indicated on FIG. 1 by the arrow 25. The distance at which the wheels 24 and 24' of each pair are spaced apart is enough to permit the plant, which has just been planted into the furrow, to pass undamaged therebetween. A shock absorber 26 is connected between each arm 21 and 21' and the chassis, and a stop bar 27 is arranged ahead of each pair of wheels 24 and 24' limiting the extent of downward movement of the corresponding arms 21 and 21'.

The machine is also provided with a plant feeding mechanism indicated in general on FIG. 1 by the reference number 28, each main wheel being provided with at least one planter indicated in general by the reference number 29, and a mechanism capable of timing the radial movement of the planting tube and indicated in general by the reference number 30. The feeding mechanism 28, the planting tubes 29 and the synchronizing mechanisms 30 will be hereinafter explained in detail.

On each longitudinal lateral beam 2 and 2', one end of a pertinent arm 31 is riveted at 32. A corresponding furrow opening blade 33 is rigidly mounted on said arm 31. This blade 33 is capable of opening a furrow just ahead of each main wheel 8 and 8'.

As shown on FIG. 1, two follower carrying shafts 34 and 34' are freely mounted in bearings 35, each fixed on a corresponding longitudinal reinforcing beam 4 and 4', the opposed other ends of each shaft 34, 34' being housed in a sleeve 7' so as to be capable of rotating independently. On each main wheel shaft 6 and 6' corresponding cam members 36 are rigidly mounted, one of which can be seen in FIG. 4, and which are engaged by corresponding cam followers 37 and 37' the other ends of which are fixedly mounted on the pertinent cam shaft 34, 34'. On said cam shafts 34 and 34' corresponding levers 38 and 38' are also rigidly mounted and are capable of operating the pertinent feeding mechanism 28 (FIG. 1) which will be described in detail later on.

Said feeding mechanism 28 is shown on FIGS. 3 and 4 in a purely schematic way. This mechanism produces the timed feeding of the plants to each corresponding planting tube 29. In FIG. 3, the double-headed arrow 39 indicates the to and fro movement of the lever 38. The feeding mechanism comprises a first stationary platform 40 mounted on the pertinent longitudinal reinforcing beam 4 of the chassis by means of a bracket 41. The plants 42 which are to be planted and which are wrapped in a tubular wrapper are laid on this stationary platform, the roots of the plants being retained in said wrapper, so as to form small cylindrical units capable of rolling by gravity on the platform 40 toward the side of the respective main wheel 8. A gate member 43 is integral with the end of a lever 44 pivoted to pivot 45. The other end of lever 44 engages an actuating rod 46, the other end 47 of which is connected to the lever 38 and the normal position of the gate 43, related to the stationary platform 40, is such that the plants 42 cannot roll beyond the edge of platform 40. A second movable platform 48 is mounted below this platform 40 and capable of rocking on a shaft 49. The movable platform 48 is normally out of contact with the lower edge of the stationary platform 40. A stationary stop member 50 is normally spaced apart from the lower edge of the movable platform 48, so that a plant 51 may roll between the stop member 50 and the edge of the platform 48 falling within the input end of the corresponding planter 29 (which is a channeled member) movably mounted on the rim 9 of the corresponding main wheel 8. The higher edge of the movable platform 48 is connected to the lever 38 by means of a rod 52.

Referring now to FIGS. 5 to 8, the timing mechanism producing the radial movement of the planter 29 is indicated in general by the reference number 30 in FIGS. 1 and 2.

The function of the planter 29 is to locate a plant into the furrow opened by the furrow opening blade 33. The planter 29 must locate a plant into the furrow and thereafter promptly be retracted before the main wheel has rotated through a substantial angle, since otherwise the plant would be tilted. Synchronizing mechanism 30 assures the prompt retraction of the planter, after the plant has located in the furrow. This mechanism, upon the planter being in a substantially vertical position and its external end in contact with the bottom of the furrow, will retract promptly the planter, so that the plant becomes liberated. This mechanism comprises a cam track member 53 rigidly mounted on the pertinent longitudinal lateral beam 2 and has a special profile which forms a cam track 54 that has a characteristic shape with a sudden change at point 55. One of the ends of an arm 57 is pivoted to a pivot pin 56, mounted on the inner part of the rim 9 of the main wheel 8. A pivot 58 connects the other end of arm 57 to the planter 29 as will be described later on. A cam roller 60 is rotatable supported by stub shaft 59 to an intermediate portion of arm 57. The end of the arm 57 connected to the planter 29 is permanently urged towards the inner face of the rim 9 by means of a spring 61 which has one of its ends fixed at 62 to said arm 57 and its other end is fixed 63 to the inner face of the rim 9. The planter 29 comprises an external guiding sleeve 65, rigidly connected to the wheel 8, by the step-like portion 64, its planting tube 66 is telescopically slidably housed in the sleeve 65, and is capable of projecting through the rim 9. Tube 66 is connected by means of pivot 58, which passes through a slot 65', to arm 57.

Starting from the position of main wheel 8 shown on FIG. 5, and assuming that the machine advances in the direction indicated by the arrow 67, the main wheel rotating in the direction indicated by the arrow 68, the cam roller 60 meets the lower end of the cam track 54 and begins to ride upwardly on its straight portion 54' during a first portion of a complete turn of the main wheel, lifting arm 57 and thus retracting the planting tube 66 into the guiding sleeve 65. After the cam roller has reached the point 55 of the cam track 54, it begins to ride on the curved portion 54" during a second portion of the turn of the main wheel, thus maintaining retracted the planting tube 66 within the guiding sleeve 65 during its entire run on said curved portion. Once the cam roller 60 has reached the end of the curved portion 54", spring 61 draws suddenly the arm 57 in the direction of the rim 9 of the main wheel, the planting tube thus projecting again outwardly through the aperture of the rim 9, remaining in this condition during a third and last portion of the turn of the main wheel, until the end of said turn is reached, whereafter a new cycle begins when the subsequent turn of the wheel starts.

The operation of the machine will now be described.

The latter is connected by means of the drawbar 14 to a towing tractor (not shown) and the attendant —for locating the machine in its transport position— will act a pertinent valve (not shown) to send fluid through pipe 20 into the jack 18, so that the machine will be raised and roll only on the auxiliary wheels 24, thereby the main wheels 8 and the blade 33 of the plow will become out of contact with the soil or road. Thus, the machine is in the transport position to be moved towards the planting area. Once the machine reaches the planting area to start working, fluid is allowed to become discharged through pipe 20 so that the main wheels 8 and the blades 33 adopt their working positions and the tractor can now start to work on the field.

At this instant, the machine will be in proper position to start operation and in particular, reference should be made to FIG. 3, as far as the planting arrangement is concerned. Gate 43 is in its lower position and blocks the forward movement of the plants 42 which are located on the stationary platform 40 (which defines a deposit) and no plant has yet left the deposit; i.e. there is no plant in the position indicated by reference numeral 51.

As the main wheel 8 starts to rotate (due to being now in contact with the soil), the cam 36 will be in a position where the cam follower 37 will be in the lowermost position so that the cam follower shaft 34 will transfer, so to say, said position to the lever 38 which will likewise be in the lowermost position, thereby two results are achieved: In first instance, the gate 43 is raised with regard to the stationary platform 40 by means of the rod 46 and the lever 44, so that only the most forward plant in the deposit 42 will pass said gate and fall onto the movable platform 48, and in second instance, said movable platform 48 — at the same time— due to the movement of lever 38 and rod 52 is raised near to the stationary stop 50, whereby plant 51 will enter in abutting relationship with said stop 50 and thus becomes retained in said position.

The shape of the cam 36 is such that, after the plant 51 has fallen onto the movable platform, lever 38 is raised again, whereby the remaining plants become blocked within the deposit and plant 51 will roll along platform 48, the forward end of which has moved downwardly, by-passing stop 50. This plant will thus fall into the planter 29 and more particularly it allows for the plant to become located within the tubular member 66, which at this instant faces the edge of platform 48. It should be borne in mind that the planter 29 is a funnel-like arrangement, so that as soon as the plant falls onto the receiving end, it will move forward —due to gravity— within the planter, as will be easily understood by the skilled in this art.

According to the embodiment shown, one plant will be planted with each complete turn of the main wheel 8. Obviously the same explanations are applicable to the main wheel 8'.

If FIG. 5, a position is shown, where the planter 29 and tubular member 66 has just moved away from the starting position (the cam roller 60 being in contact with the straight portion of the cam track 54), where the plant 51 has been received. Upon continuing the rotation of the main wheel 8, the cam roller 60 enters in contact with the curved portion of the cam track 54. Returning now to the beginning of the planting step, when the planting tube 66 reaches the radial vertical position its end enters the bottom of the furrow; the tubular member will have been withdrawn at the moment when the cam roller 60 has passed the point 55, whereby the plant has become set in the furrow (FIG. 6). The auxiliary wheel 24 will tamp the earth adjacent the planted plant, which thereby becomes fit into the soil.

As the main wheel 8 continues rotating, the tubular member 66 will become again projected through the rim of the main wheel 8 (see FIG. 7).

It will be understood that the distance existing between two successive planted plants in a row depends on the diameter of the main wheels 8. It is possible to provide in each of the main wheels 8, 8', a pair of diametrically opposite planters, with the pertinent accessories, so that thereby the production can be increased.

In order to be able to vary the distance between two adjacent rows of plants, such as those provided by the wheels 8, 8', the beams 3, 3' could be a telescopical arrangement (not shown) and then axles 6, 6' and 34, 34' will likewise have to be of a telescopical structure.

Bushings 7 and 7' which support the facing ends of the pertinent axles and cam follower shafts are provided in order to allow the machine to carry out a turn during which one of the wheels will obviously have to rotate at higher speed than the other.

In accordance with tests carried out with an experimental machine, it has been found that the rear auxiliary wheels 24, 24' arranged as shown in FIG. 1 will fulfil better the task of tamping the earth adjacent the set plant when they are mounted in a sloped converging manner, as shown in FIG. 10, see particularly reference numerals 69, 69', 70, 70'. The slope of each of these auxiliary wheels with regard to the vertical is approximately 30°.

Although in FIG. 1 arms 21, 21' have been shown as being pivoted to the beams 2, 2', respectively, they can likewise be mounted in a stationary manner thereon, in which event the shock absorbers 26 would have to be substituted by rigid links (not shown).

In FIG. 1, shafts 23, 23' are passing through arms 21, 21', respectively, which shafts 23, 23' support the pertinent wheels 24, 24'. However, it is evident that these shafts could be mounted in bearings 71, located on the lower side or the upper side of said arms (see FIG. 13). The correct selection of which of the structures will be used, depends on the nature of the soil.

Although in FIG. 1 the blade 33 has been shown, it is advisable to replace blade 33 by a blade 72 of the type shown in FIG. 11. The common blade shown in FIGS. 1 and 2 has a tendency to dig upwardly when it strikes hard soil, stones and the like, while the blade shown in FIG. 11 has the tendency to maintain a constant depth of plowing. The blade of the type 72 shown in FIG. 11 will be called hereinafter a "sub-soiling" blade. The sub-soil blade 72 is mounted on support 31 by means of clamping means 73.

Practice has also shown that it is advisable, in order to achieve a good tamping of the earth adjacent the just planted plants and to avoid that air becomes blocked in substantial amounts around the roots of the plant, to irrigate the soil at the furrow portion where the plant has been set, with a comparatively small quantity of water and preferably at the moment the planter is in vertical position at the point where the plant has been set into the bottom of the furrow. This requires that the machine is provided with a water deposit 74, conveniently mounted on chassis 1 by means of support 74', as shown in FIG. 10, or as an alternative, the water tank can be mounted on a special carriage, which is towed by the machine. In order to achieve that an exact amount of water is supplied at the precise instant, it is convenient that the hose 75 is connected through a water-feeding arrangement, as shown in FIG. 12 to its discharge port 86. Conveniently, the guiding sleeve 65, which slidably houses the planting tube 66, is connected to a feeding conduit 84 which may pass through one of the spokes of the wheel or may be connected thereto in any other suitable manner. In FIG. 12, one embodiment is shown as to how water is injected into said sleeve 65 near the rim 9. The hose 75, which is connected to the tank 74, ends in a stationary casing 76 which has a seal 77 in sealing contact with shaft 6 (or 6'). This casing 76 in turn is coupled to a bushing 78, which is rigidly connected at 79 to the inside face 80 of the main wheel 8, through a seal 81 provided between the casing 76 and the bushing 78, thereby providing a sealed arrangement which enables to transfer the water from the tank towards the conduit 84 by passing through spaces 82, 83. Conduit 84 debouches into port 86 which thereby feeds the water into the bushing 65. Conveniently, hose 75 is connected to a pump 88 which may be driven either by the wheels of the machine or directly by the tractor, and thereby fluid will be supplied to space 82 and from space 83 through conduit 84 towards port 86. Furthermore, in conduit 84, a timing valve 87 is arranged, which will only open at the proper time, when the planter 29 has set the plant in the furrow. Since the pump 88 may be of the continuous operating type, a check valve 89 in a by-pass 89' may be provided to avoid that excessive pressure may be build-up in the water-feeding arrangement. From the foregoing it is apparent that the pump arrangement 88 and by pass 89' is not a fundamental requirement since the feeding could likewise be forwarded by gravity, but always the timing valve 87 will be required, to avoid that water is continuously supplied to the planter 29.

Usually, the young plants are supplied by the tree nurseries in casings containing 100 or more plants and therefore a mechanism has been conceived which can forward successive casings to the attendant who will have to replenish the deposit defined by platform 40. Conveniently, according to one embodiment, a rotary platform 91 mounted on stub shaft 92 may carry a supply of such casings, which rotate towards the bench 93, where one or two attendants may be seated who can then withdraw the plants from such casing and feed the respective deposit. Thus, a continuous feeding of plants is assured, bench 93 is preferably mounted on a stationary platform 94 which is shown in FIG. 13, but not in FIG. 1. Driving means may be provided and connected to stub shaft 92, which driving means are not shown and which are operated by the attendant in accordance with the requirements as far as the feeding is concerned.

However, the platform may also be rotated by hand.

An alternative embodiment is shown in FIG. 14, where the same platform 94 and bench 93 are shown, but combined with three endless conveyors 95, 96 and 97 of which the conveyors 96 and 97 can supply rows of casings towards the bench 93 and the middle conveyor 95, which will move in opposite direction, is destined to receive the empty casings for discharge.

In a further development according to the present invention and as shown in FIG. 10, between the rear wheels 24, 24' and the main wheel 8, a pair of spaced apart scoopers 98, 99, respectively mounted on arms 100, 101 and 102 are provided, which assures that the plant which has just been set into the furrow, is maintained in proper vertical position until the convergent tamping wheels 24, 24' reach the zone adjacent the plant to tamp the earth, as previously described. Obviously, the scoopers will have to be spaced apart a distance which as a minimum is equal to the maximum cross-sectional area of a plant (or small tree) to be planted.

We claim:

1. Automatic planting machine for planting in rows, small trees and the like into the bottom of a furrow opened in the soil, said furrow may be opened by the same machine, said machine comprising a chassis having at least a pair of sides, a main wheel at each side of the chassis, independent axles for each main wheel and rotatably supported by said chassis, each main wheel having a rim, at least one through aperture in each rim, a planter having a planting tube slidably mounted in each of said through apertures and timed with the rotation of the corresponding main wheel to project to the outside of said through opening and rim upon said through opening facing the bottom of said furrow, each planting tube having an input end, and means capable of feeding plants, one at a time, into the input end of each planting tube to enable planting of said plant into the bottom of said furrow upon said through opening facing the bottom of said furrow.

2. The automatic planting machine of claim 1, wherein said planter comprises a guiding sleeve rigidly mounted on the inside of said rim and facing said through opening, said planting tube being slidably mounted in said guiding sleeve, said guiding sleeve having at least one slot, a pin connected to said planting tube and emerging through said slot, a lever pivoted to said pin at one end portion and having an opposite end portion pivoted to said rim, a cam roller rotatably mounted on an intermediate portion of said lever, a stationary cam track having a first straight portion and a second curved portion, said cam roller being capable of entering in contact with said first straight portion of the cam track during a first portion of a complete turn of the main wheel, thereby being capable of retracting said planting tube into said through opening, thereafter entering in contact with said second curved portion of the cam track during a second portion of the turn of the wheel thereby being capable of maintaining retracted said planting tube, and thereafter removing from contacting said cam track at the end thereof during the last portion of said complete turn of the main wheel, thereby being capable of projecting again said planting tube through said through aperture due to the existance of resilient means connected to said lever urging said planting tube through said through opening towards the outside of said rim.

3. The automatic planting machine of claim 1, wherein said means capable of feeding plants comprises a cam follower shaft rotatably supported by said chassis and parallel to one of said independent axles, a cam mounted on said axle, said cam follower shaft rigidly supporting a cam follower in driven relationship with said cam, a lever controlled by said cam follower shaft, a stationary platform defining a deposit for plants to be planted and an exit, and a pivotable platform located below said stationary platform, a gate member pivotally supported by said chassis and connected to said lever, said gate member being capable of opening and closing said exit of said stationary platform, said movable platform being likewise connected to said lever and projecting beyond said stationary platform, and a stop arranged above said pivotable platform ahead of said stationary platform and thereby of its exit, whereby, upon said lever moving from one end position towards the other, said gate becomes opened and the front end portion of said pivotable platform approaches said stationary platform and consequently likewise said stop.

4. The automatic planting machine of claim 1, wherein said chassis has a front portion and a rear portion, said rear portion having at each corner with said sides a pair of rear auxiliary wheels defining in between them, at the portion of contact with the soil, a space which is at least equal to the maximum cross-sectional area of the plant to be planted, each pair of wheels being capable of tamping the earth of the furrow adjacent the planted tree.

5. The automatic planting machine of claim 4, wherein the rear wheels of each pair of rear wheels converge towards the point of contact with the soil.

6. The automatic planting machine of claim 4, wherein the rear portion of said chassis pivotally supports a drawbar having connected thereto, at an intermediate portion thereof, a jack capable of varying the distance between said chassis and said drawbar for raising said main wheels from the soil, to achieve the transport position for said machine.

7. The automatic planting machine of claim 2, wherein a water feeding arrangement debouches into said guiding sleeve, said water feeding arrangement including timing means adapted to supply water to the soil upon a plant having been planted.

8. The automatic planting machine of claim 3, wherein said chassis supports additional conveying means for conveying cases containing plants towards an attendant's post for an attendant who will replenish the deposit of plants formed by said stationary platform.

9. The automatic planting machine of claim 8, wherein said additional conveying means comprises a rotatable platform.

10. The automatic planting machine of claim 8, wherein said additional conveying means comprises at least a pair of endless conveyors moving in one direction, in between which there is a third endless conveyor moving in opposite direction.

11. The automatic planting machine of claim 4, wherein between said pair of auxiliary rear wheels and said main wheel, a pair of scoopers is arranged having a distance in between them which is as the minimum equal to the maximum cross-sectional area of the plant to be planted, said scoopers are arranged at a height with regard to the chassis which is located above said soil.

* * * * *

UNITED STATES PATENT AND TRADEMARK OFFICE
CERTIFICATE OF CORRECTION

PATENT NO. : 4,091,751
DATED : May 30, 1978
INVENTOR(S) : DRI, Alfredo Felix and MIRANDA, Jorge Cesar It is certified that error appears in the above-identified patent and that said Letters Patent are hereby corrected as shown below:

On the cover sheet, left column, in ICIREPAT [76], "Ark."

should read-- Argentina--.

*Signed and Sealed this*

*Twenty-fourth* Day of *October 1978*

[SEAL]

Attest:

RUTH C. MASON
*Attesting Officer*

DONALD W. BANNER
*Commissioner of Patents and Trademarks*